US012742473B2

(12) United States Patent
Chollet et al.

(10) Patent No.: US 12,742,473 B2
(45) Date of Patent: Sep. 22, 2026

(54) BEARING DEVICE WITH INTEGRATED ELECTRIC INSULATION, IN PARTICULAR FOR AN ELECTRIC MACHINE OR MOTOR

(71) Applicant: AKTIEBOLAGET SKF, Gothenburg (SE)

(72) Inventors: Mickael Chollet, Joué-lès-Tours (FR); Anthony Simonin, Tours (FR); Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/220,255

(22) Filed: May 28, 2025

(65) Prior Publication Data

US 2025/0377013 A1 Dec. 11, 2025

(30) Foreign Application Priority Data

Jun. 6, 2024 (FR) ...................................... 2405944

(51) Int. Cl.
*F16C 19/06* (2006.01)
*F16C 19/52* (2006.01)
(Continued)

(52) U.S. Cl.
CPC .............. *F16C 19/06* (2013.01); *F16C 19/52* (2013.01); *F16C 33/586* (2013.01);
(Continued)

(58) Field of Classification Search
CPC ........ F16C 19/06; F16C 19/52; F16C 27/066; F16C 33/586; F16C 35/077;
(Continued)

(56) References Cited

U.S. PATENT DOCUMENTS 1,513,295 A 10/1924 Talley
2,283,839 A 5/1942 Wright
(Continued)

FOREIGN PATENT DOCUMENTS

CN 103780001 A 5/2014
DE 102007060968 A1 7/2008
(Continued)

OTHER PUBLICATIONS

Unpublished U.S. Appl. No. 19/068,569, first named inventor: Benoit Arnault, filed Mar. 2, 2025.
(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A bearing device includes a bearing having first and second rings, a bushing, and an electrically insulating insert over-molded between and connecting a first cylindrical surface of the bushing and a second cylindrical surface of the second ring. A convex surface connects the first cylindrical surface of the bushing to a first front face of the bushing, and the convex surface has a first radius of curvature. The convex surface meets the first cylindrical surface at a sharp edge and the convex surface meets the first front face of the bushing at a second sharp edge.

8 Claims, 4 Drawing Sheets

(51) Int. Cl.
*F16C 33/58* (2006.01)
*F16C 35/077* (2006.01)
*H02K 5/173* (2006.01)

(52) U.S. Cl.
CPC ........... *F16C 35/077* (2013.01); *H02K 5/173* (2013.01); *F16C 2220/70* (2013.01); *F16C 2380/26* (2013.01)

(58) Field of Classification Search
CPC . F16C 2220/70; F16C 2380/26; H02K 5/173; H02K 5/1732; H02K 5/1735; H02K 5/1737
See application file for complete search history.

(56) References Cited

U.S. PATENT DOCUMENTS

| | | | |
|---|---|---|---|
| 3,447,846 A | 6/1969 | Marsh | |
| 4,511,837 A | 4/1985 | Vermeiren et al. | |
| 5,059,041 A | 10/1991 | Watanabe et al. | |
| 6,482,140 B1 | 11/2002 | Takatsu | |
| 6,645,415 B2 | 11/2003 | Takatsu | |
| 6,715,925 B2 | 4/2004 | Pairone et al. | |
| 9,273,772 B2 | 3/2016 | Ichikawa et al. | |
| 11,002,315 B2 | 5/2021 | Stephan | |
| 12,196,266 B2 | 1/2025 | Chollet | |
| 2007/0081752 A1 | 4/2007 | Kametaka et al. | |
| 2010/0326788 A1 | 12/2010 | Kamm et al. | |
| 2011/0038577 A1 | 2/2011 | Horling et al. | |
| 2014/0111046 A1 | 4/2014 | Murikipudi et al. | |
| 2015/0322790 A1 | 11/2015 | Yao et al. | |
| 2019/0226526 A1 | 7/2019 | Hubert et al. | |
| 2019/0323558 A1 | 10/2019 | Stephan | |
| 2020/0047795 A1 | 2/2020 | Falossi et al. | |
| 2022/0094237 A1 | 3/2022 | Kisch et al. | |
| 2023/0220874 A1 | 7/2023 | Arnault et al. | |
| 2023/0220881 A1 | 7/2023 | Arnault et al. | |
| 2023/0220882 A1 | 7/2023 | Arnault et al. | |
| 2023/0223813 A1 | 7/2023 | Arnault et al. | |
| 2023/0400060 A1 | 12/2023 | Barthelme et al. | |
| 2023/0407921 A1 | 12/2023 | Barthelme et al. | |
| 2024/0026926 A1 | 1/2024 | Chollet | |
| 2024/0369104 A1* | 11/2024 | Schertz | F16C 19/06 |
| 2025/0069998 A1 | 2/2025 | Kotani | |

FOREIGN PATENT DOCUMENTS

| | | | | |
|---|---|---|---|---|
| DE | 102007060906 B3 | | 10/2009 | |
| DE | 102013223677 A1 | | 5/2015 | |
| DE | 102013225341 A1 | | 6/2015 | |
| DE | 102015222568 A1 | | 5/2017 | |
| DE | 102020106338 A1 | | 9/2021 | |
| DE | 102021109281 A1 | * | 10/2022 | F16C 35/077 |
| DE | 102021211225 A1 | * | 4/2023 | F16C 35/077 |
| DE | 102022111286 B3 | * | 6/2023 | H02K 5/173 |
| EP | 0417744 B1 | | 1/1995 | |
| EP | 2258637 A2 | | 12/2010 | |
| EP | 3302823 B1 | | 2/2019 | |
| FR | 3036884 A1 | | 12/2016 | |
| FR | 3131762 A1 | | 7/2023 | |
| FR | 3131764 A1 | | 7/2023 | |
| FR | 3131766 A1 | | 7/2023 | |
| FR | 3131767 A1 | | 7/2023 | |
| FR | 3138173 A1 | | 1/2024 | |
| JP | H0397512 A | | 4/1991 | |
| JP | H04210124 A | | 7/1992 | |
| JP | H1037949 A | | 2/1998 | |
| JP | 2002048145 A | * | 2/2002 | F16C 33/586 |
| JP | 2005320983 A | | 11/2005 | |
| JP | 2008057568 A | | 3/2008 | |
| JP | 2013241948 A | | 12/2013 | |
| JP | 2019138467 A | | 8/2019 | |
| WO | 2019156050 A1 | | 8/2019 | |
| WO | 2023223813 A1 | | 11/2023 | |

OTHER PUBLICATIONS

Unpublished U.S. Appl. No. 19/298,460, first named inventor: Jean-Marie Gerard, filed Aug. 13, 2025.
Unpublished U.S. Appl. No. 19/263,838, first named inventor: Benoit Arnault, filed Jul. 9, 2025.
Unpublished U.S. Appl. No. 19/235,701, first named inventor: Mickael Chollet, filed Jun. 12, 2025.
Preliminary Search Report from the French Patent Office dated Jan. 17, 2025 in related French application No. FR2405944, including Search Report and Written Opinion.

* cited by examiner 28a
a1
28e
a2
28c
28 a3
28a
28f
a4
28d
28

BEARING DEVICE WITH INTEGRATED ELECTRIC INSULATION, IN PARTICULAR FOR AN ELECTRIC MACHINE OR MOTOR

CROSS-REFERENCE

This application claims priority to French patent application no. 2405944 filed on Jun. 6, 2024, the contents of which are fully incorporated herein by reference.

TECHNOLOGICAL FIELD

The present disclosure relates to the field of bearings that are used in particular in electric motors, electric machines and associated equipment.

BACKGROUND

In an electric machine or motor, at least one rolling bearing is mounted between the housing of the electric machine or motor and the rotary shaft in order to support this shaft. In operation, when the shaft is rotating, a difference in electric potential may arise between the shaft and the housing of the electric machine or motor, generating an electric current between the inner ring of the rolling bearing which is connected to the shaft, and the outer ring which is connected to the housing. The electric current passing through the components of the rolling bearing may damage these components, in particular the rolling elements and the raceways formed in the inner and outer rings. The electric shocks may also cause vibrations.

To remedy these drawbacks, it is known to replace the rolling elements of the bearing that are made from the same steel as that of the inner and outer rings with rolling elements made of ceramic. This kind of bearing is generally referred to as a hybrid rolling bearing. However, such a hybrid rolling bearing is relatively expensive.

To remedy the abovementioned drawbacks, it is also known to equip the outer ring of the rolling bearing with an insulating sleeve comprising a bushing and an insulating insert made of an electrically insulating material interposed radially between the outer ring and the bushing. However, when such a bearing device is being mounted inside a housing of the motor or removed therefrom, the bore of the housing may be damaged.

SUMMARY

The present disclosure aims to remedy this drawback.

The disclosure relates to a bearing device comprising a bearing having a first ring and a second ring that are configured to rotate with respect to one another. The device also comprises at least one insulating sleeve mounted on the second ring of the bearing. The insulating sleeve includes a bushing and an insulating insert that is interposed radially between the second ring of the bearing and the bushing. The insulating insert is made of an electrically insulating material.

The bushing has a cylindrical outer surface and a cylindrical inner surface radially spaced from the outer surface, which delimit a radial thickness of the bushing. The bushing also has first and second front faces that delimit an axial length of the bushing. The insulating insert is fastened to the second ring of the bearing and at least to the inner or outer surface of the bushing.

According to one general feature, a first convex surface having a cross section lying on an arc of a circle and having a radius of curvature connects the first front face of the bushing to the other surface of the outer and inner surfaces of the bushing. According to another general feature, the first convex surface is connected to the other surface of the bushing while forming a sharp edge, and is connected to the first front face of the bushing while forming another sharp edge.

This results in a bearing device with integrated electric insulation that is economical compared with conventional hybrid rolling bearings.

Furthermore, the device is easy to fit in the associated electric machine or motor without there being a risk of the bore of the electric motor or machine being damaged, given the existence of the first concave radius with a truncated shape.

Each sharp edge forms a change of slope between the first convex surface and the other surface of the bushing, or between the first convex surface and the first front face of the bushing. As used herein a "sharp edge" is a corner at which, when viewed in section, the slope of the convex surface changes discontinuously. Thus, the convex surface on one side of the corner has a tangent that changes continuously and the cylindrical surface on the other side of the corner is a straight line when viewed in section. In other words, the tangent of the does not continuously approach zero at the junction of the convex surface and the cylindrical surface. Examples of sharp edges or corners as used herein are shown in FIGS. 2 and 3.

Preferably, a second convex surface having a cross section lying on an arc of a circle and having a radius of curvature connects the second front face of the bushing to the other surface of the bushing. The second convex surface is connected to the other surface of the bushing while forming a sharp edge, and is connected to the second front face while forming another sharp edge.

The radius of curvature of the second convex surface may be equal to the radius of curvature of the first convex surface. Alternatively, the radii of curvature could have different values.

Advantageously, the bushing is made of metal material. The bushing may, for example, be obtained by pressing or by machining.

Preferably, the insulating insert is overmolded on the second ring of the bearing and at least on the surface of the bushing. Alternatively, the insulating insert may be fastened by any other appropriate means, for example by adhesive bonding.

If the insulating insert is made of synthetic material or elastomer material, this makes the device less sensitive to variations in temperature.

In one embodiment, the insulating insert covers the whole of the surface of the bushing. In this case, the insulating insert entirely covers the surface of the bushing in the axial direction and in the circumferential direction.

The expression "axial direction" means the direction parallel to the axis of the bearing device.

The expression "circumferential direction" means the direction which is perpendicular both to the axial direction and to a radius of the bearing device, in other words tangent to a circle the center of which is on the axis of the bearing device.

According to a first design, the bushing delimits the outer surface of the device. In this case, the second ring is the outer ring of the bearing. According to an alternative second design, the bushing delimits the inner surface of the device. In this case, the second ring is the inner ring of the bearing. In a particular embodiment, the bearing comprises at least one row of rolling elements disposed between raceways of the first and second rings. The rolling elements may be made of metal material.

The disclosure also relates to an electric motor comprising a housing, a shaft and at least one bearing device as defined above and mounted radially between the housing and the shaft.

The disclosure also relates to a method for manufacturing a bushing of a bearing device as defined above, comprising the following successive steps: producing a bushing blank that gives it its basic geometry, a heat treatment step for giving the bushing blank the required hardness, radially grinding the first front face of the bushing blank and a part of the first convex surface which is adjacent to the first front face, and axially grinding the other surface of the bushing blank and a part of the first convex surface which is adjacent to the other surface in order to obtain the bushing.

The expression "radial direction" means the direction along a radius of the bearing device, i.e. any direction that intersects the axis of the bearing device and is perpendicular to that axis.

BRIEF DESCRIPTION OF THE DRAWINGS

The present disclosure will be understood better from studying the detailed described of embodiments, which are given by way of entirely non-limiting example and are illustrated in the appended drawings, in which.

DETAILED DESCRIPTION

Figure 1:
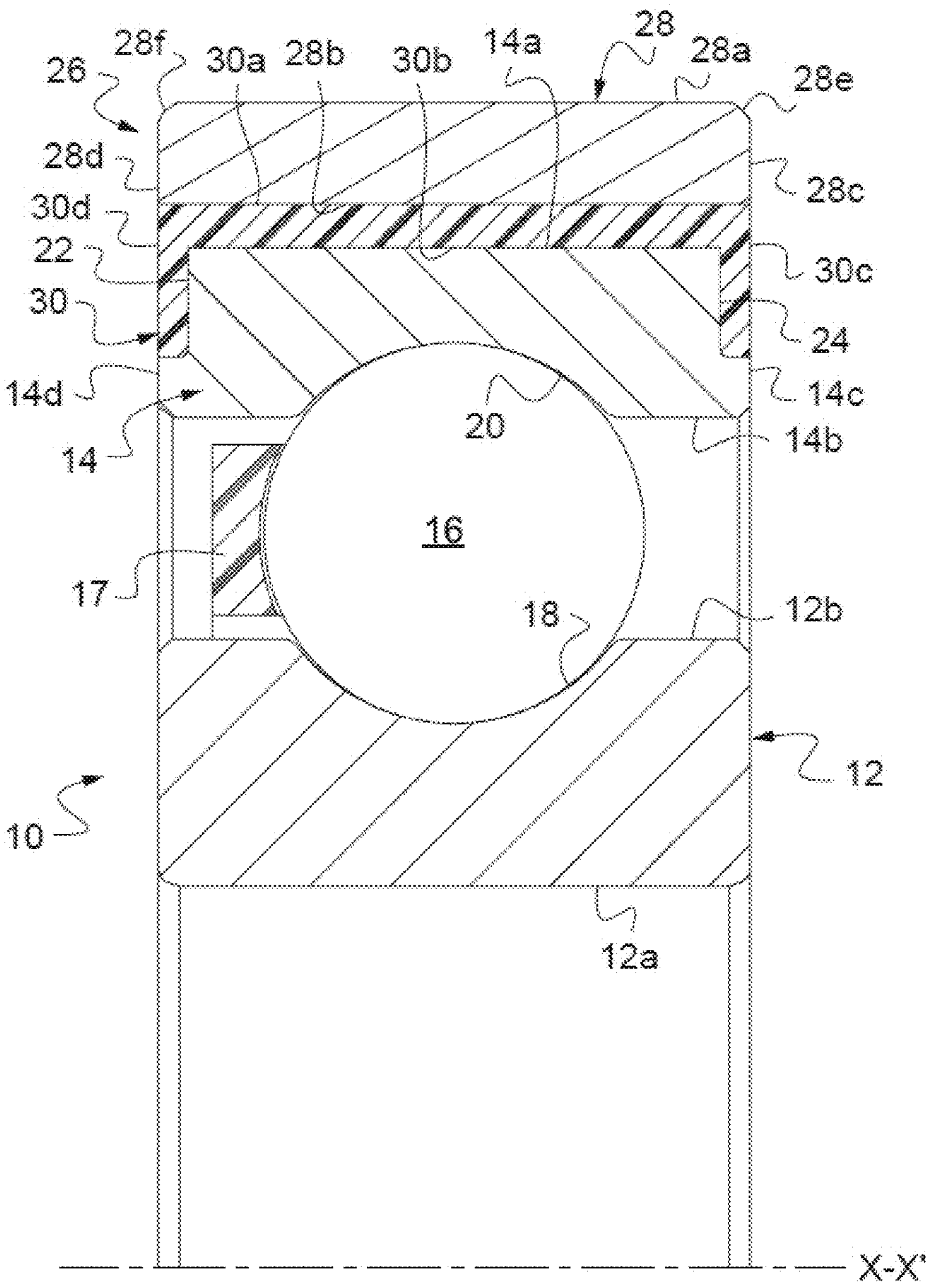
FIG. 1 is an axial sectional view of a bearing device according to an exemplary embodiment of the disclosure which device includes a bushing.

The bearing device illustrated in FIG. 1 comprises a bearing 10 having a first ring 12 and a second ring 14 that are configured to rotate relative to one another about the axis X-X' of the bearing. In the exemplary embodiment illustrated, the first ring 12 is the inner ring of the bearing and the second ring 14 is the outer ring. The bearing device is configured such that it does not conduct electric current and includes integrated electric insulation.

The inner ring 12 and outer ring 14 of the bearing are concentric and extend axially along the axis X-X' of the bearing. The inner ring 12 and outer ring 14 are made of steel. The rings are of the solid type.

In the exemplary embodiment illustrated, the bearing 10 also includes a row of rolling elements 16, in this case balls, that are interposed radially between the inner ring 12 and outer ring 14. The rolling elements 16 are made of steel. The bearing 10 also comprises a cage 17 for maintaining the regular circumferential spacing of the rolling elements 16. The bearing 10 may also be equipped with seals or flange gaskets.

The inner ring 12 comprises a cylindrical bore 12*a*, a cylindrical, axially extending outer surface 12*b* radially opposite the bore, and two opposite radially extending front faces (not referenced) that axially delimit the bore 12*a* and the outer surface 12*b*. The bore 12*a* and the outer surface 12*b* delimit the radial thickness of the inner ring 12. The bore 12*a* forms the inner surface of the inner ring. The inner ring 12 also has an inner raceway 18 for the rolling elements 16, which is formed on the outer surface 12*b*. The raceway 18 is directed radially outward.

The outer ring 14 comprises a cylindrical axially extending outer surface 14*a*, a cylindrical bore 14*b* radially opposite the outer surface 14*a*, and two opposite radially extending front faces 14*c*, 14*d* that axially delimit the bore. The outer surface 14*a* and the bore 14*b* delimit the radial thickness of the outer ring 14. The bore 14*b* has a stepped shape. The outer ring 14 also has an outer raceway 20 for the rolling elements 16, which is formed on the bore 14*b*. The raceway 20 is directed radially inward.

In the exemplary embodiment illustrated, a groove 22 is formed in the front face 14*d* of the outer ring. The groove 22 is oriented and open axially towards the outside of the outer ring. The groove 22 has an axially facing bottom which is offset axially towards the inside of the ring with respect to the front face 14*d*. The bottom of the groove 22 forms a shoulder. The bottom of the groove 22 extends radially in this case for reasons of ease of manufacture. The groove 22 is annular in this case.

Similarly, a groove 24 is formed in the front face 14*c* of the outer ring. The groove 24 is oriented and open axially towards the outside of the outer ring. The groove 24 has a bottom which is offset axially towards the inside of the ring with respect to the front face 14*c*. The bottom of the groove 24 forms a shoulder. The bottom of the groove 24 extends radially in this case. The groove 24 is annular in this case. The grooves 22, 24 are mutually symmetric with respect to a radial midplane of the outer ring. The grooves 22, 24 axially delimit the outer surface 14*a*. Alternatively, grooves 22, 24 could be omitted.

The bearing device also has an electrically insulating sleeve 26 mounted on the outer ring 14. The insulating sleeve 26 is mounted on the outer surface 14*a* of the outer ring 14. The insulating sleeve 26 is secured to the outer ring 14. The insulating sleeve 26 includes a bushing 28 and an insulating insert 30 interposed radially between the outer ring 14 and the bushing 28. The insulating insert 30 is in this case overmolded on the outer ring 14 and on the bushing 28.

The bushing 28 has an annular shape. The bushing 28, of axis X-X', extends axially. The bushing 28 is formed in one piece in this case. Alternatively, the bushing 28 could be made in a plurality of pieces bearing against one another, for example two identical pieces. The bushing 28 has a cylindrical annular axial outer surface 28*a* and a cylindrical annular axial bore 28*b* which is radially opposite the outer surface 28*a*. The bore 28*b* forms the inner surface of the bushing 28. The bore 28*b* is oriented radially inward, that is, towards the outer ring 14 and the insulating insert 30. The axis of the bore 28*b* is coaxial with the axis X-X'.

The bushing 28 also has two opposite radially extending front faces 28*c*, 28*d* that axially delimit the bore 28*b* and the outer surface 28*a*. The front faces 28*c*, 28*d* delimit the axial length of the bushing. The outer surface 28*a* and the bore 28*b* delimit the radial thickness of the bushing 28. The outer surface 28*a* of the bushing delimits the outer surface of the bearing device 10. In other words, the outer surface 28*a* defines the outside diameter of the bearing device 10.

In the exemplary embodiment illustrated, the front faces 28*c*, 28*d* of the bushing are respectively coplanar with the front faces 14*c*, 14*d* of the outer ring. Alternatively, other arrangements could be provided. For example, the bushing 28 could have a smaller, or larger, axial dimension and be axially set back from the faces 14*c*, 14*d* of the outer ring, or protrude from the faces.

Figure 2:
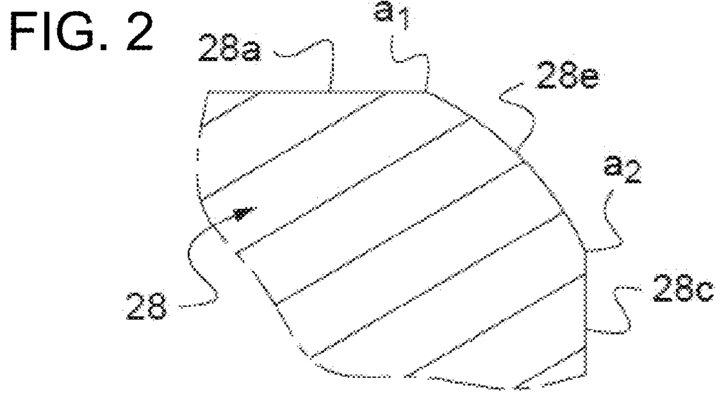
FIG. 2 is a detail view of a first portion of the bushing of the device of FIG. 1.
Figure 3:
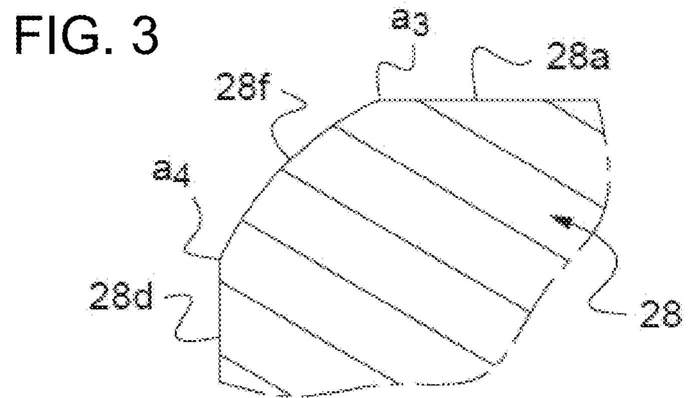
FIG. 3 is a detail view of a second portion of the bushing of the device of FIG. 1.
Figure 4:
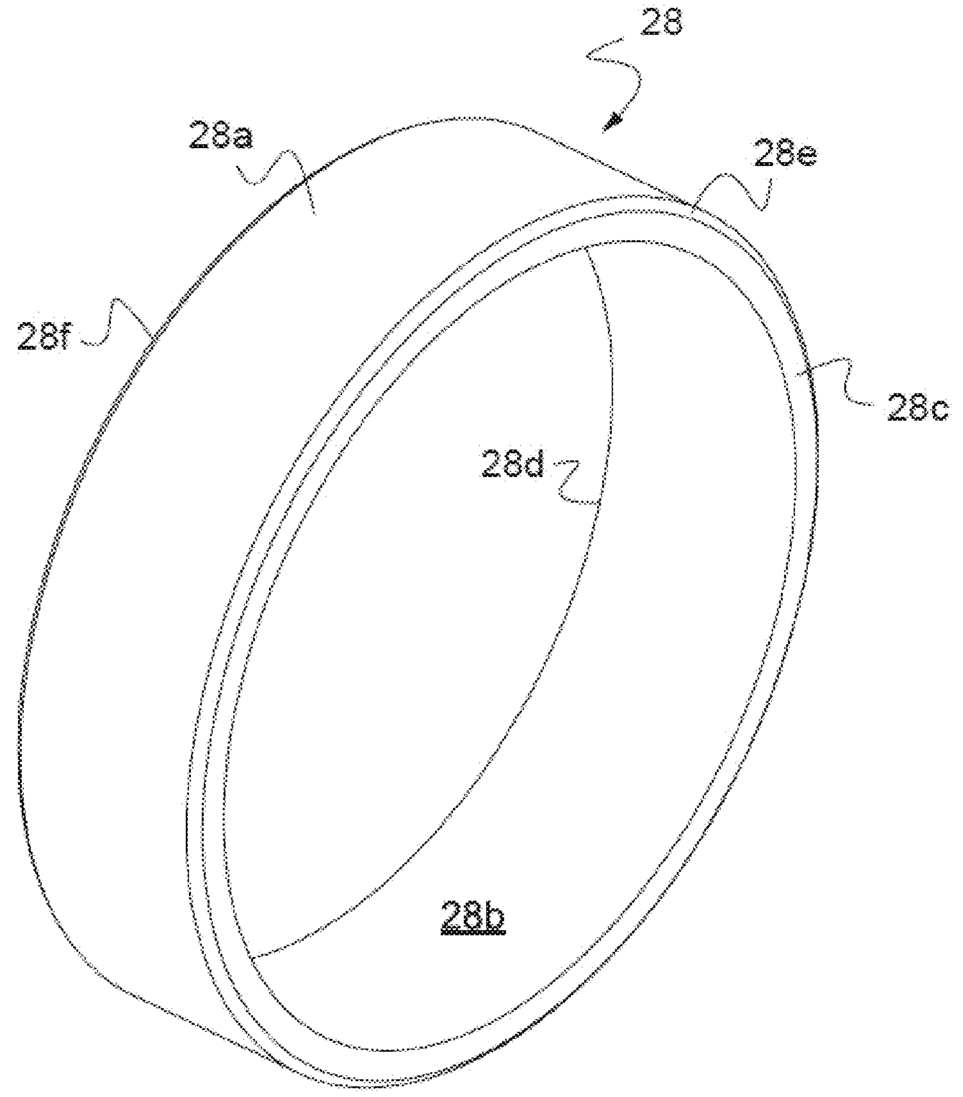
FIG. 4 is a perspective view of the bushing of the device of FIG. 1.

As is illustrated more clearly in FIGS. 2 and 3, the bushing 28 also includes two annular convex surfaces 28*e*, 28*f* that respectively connect the front faces 28*c*, 28*d* to the outer surface 28*a*. Each of the convex surfaces 28*e*, 28*f*, when viewed in axial section, lies on an arc of a circle and thus has a radius of curvature which radius of curvature may be constant from a first end of the convex surface to a second end of the convex surface.

The convex surface 28*e* is connected directly to the front face 28*c* and to the outer surface 28*a*. The convex surface 28*f* is connected directly to the front face 28*d* and to the outer surface 28*a*. In other words, for each of the convex surfaces 28*e* and 28*f*, there is no additional surface between, for the one part, this convex surface and the associated front face 28*c*, 28*d*, and, for the other part, this convex surface and the outer surface 28*a*. The radius of curvature of each convex surface 28*e*, 28*f*, thus may be constant from the outer surface 28*a* to the respective front surface 28*c*, 28*d*.

The convex surface 28*e* meets the outer surface 28*a* at a sharp edge a1 and meets the front face 28*c* at another sharp edge a2. Similarly, the convex surface 28*f* is meets the outer surface 28*a* at a sharp edge a3 and meets the front face 28*d* at another sharp edge a4.

In the exemplary embodiment illustrated, the radius of curvature of the convex surfaces 28*e* and 28*f* of the bushing are identical to one another. Thus, the lengths of the radii 28*e* and 28*f* are equal. Alternatively, the radius of curvature of the convex surfaces 28*e* and 28*f* could be different.

The bushing 28 is made of metal, preferably, steel. The bushing 28 may be obtained from a sheet metal blank by cutting, pressing and roll bending. Alternatively, the bushing 28 may be obtained from a tube or from forged and/or rolled blanks, or by stamping.

The bushing 28 can be manufactured by the following method.

In a first step, a bushing blank is produced that gives it its basic geometry with the outer surface 28*a*, the bore 28*b*, the front faces 28*c*, 28*d* and the convex surfaces 28*e*, 28*f*.

Figure 5:
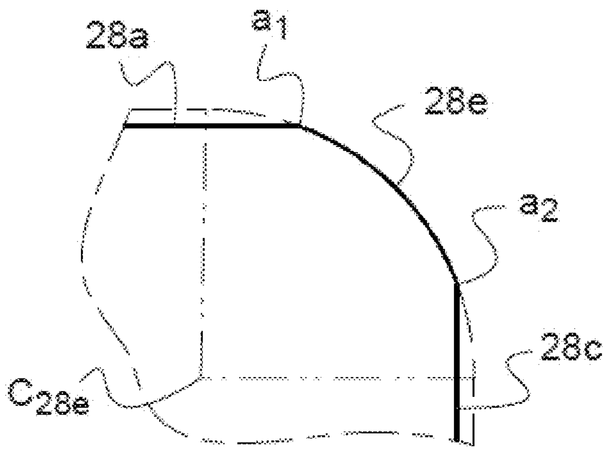
FIG. 5 is a detail view of a first portion of the bushing of the device from FIG. 1 showing a section of the surface before grinding in dashed lines and after griding in solid lines.
Figure 6:
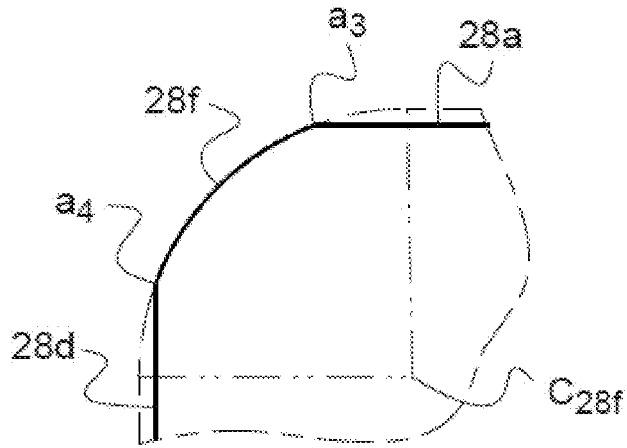
FIG. 6 is a detail view of a second portion of the bushing of the device from FIG. 1 showing a section of the surface before grinding in dashed lines and after griding in solid lines.

In FIGS. 5 and 6, the outer surface 28*a*, the convex surfaces 28*e*, 28*f* and the front faces 28*c*, 28*d* of the bushing blank are depicted by way of dashed lines. The centers of the convex surfaces 28*e*, 28*f* bear the references C28*e*, C28*f*.

Next, in a following second step, the bushing blank is heat treated in order to give it the required hardness.

Then, in a following third step, the front face 28*c* of the bushing blank and a part of the convex surface 28*e* that is adjacent to this front face 28*c*, and the front face 28*d* of the bushing blank and a part of the convex surface 28*f* that is adjacent to this front face 28*d* are ground in the radial direction. The sharp edges a2 and a4 are formed during this step.

During this third step, the outer surface 28*a* of the bushing blank, a part of the convex surface 28*e* that is adjacent to the outer surface 28*a*, and a part of the convex surface 28*f* that is adjacent to this outer surface 28*d* are also ground in the axial direction. The sharp edges a1 and a3 are formed during this step.

By way of these grinding steps, the convex surfaces 28*e*, 28*f* of the bushing are truncated. The sharp edge a1 is offset axially towards the outside, i.e. towards the front face 28*c*, with respect to the center C28*e* of the concave radius 28*e*. The sharp edge a2 is offset radially towards the outside, i.e. towards the outer surface 28*a*, with respect to the center C28*e* of the convex surface 28*e*. In an identical way, the sharp edge a3 is offset axially towards the outside, i.e. towards the front face 28*d*, with respect to the center C28*f* of the convex surface 28*f*, and the sharp edge a4 is offset radially towards the outside, i.e. towards the outer surface 28*a*, with respect to the center C28*f* of the convex surface 28*f*.

After these grinding steps, the bushing 28 exhibits its final shape and its final dimensions.

The insulating insert 30 is made of electrically insulating material. The insulating insert 30 may, for example, be made of synthetic material, such as PEEK or PA46, or be made of an elastomer material, for example of rubber.

The insulating insert 30 is interposed radially between the outer surface 14*a* of the outer ring and the bore 28*b* in the bushing. The insulating insert 30 covers the outer surface 14*a* of the outer ring. The insulating insert 30 in this case entirely covers the outer surface 14*a* with regard to the axial and circumferential directions. The insulating insert 30 also covers the grooves 22, 24 in the outer ring. The insulating insert 30 also covers the bore 28*b* in the bushing. The insulating insert 30 in this case also entirely covers the bore 28*b* with regard to the axial and circumferential directions.

As indicated above, the insulating insert 30 is in this case overmolded on the outer ring 14 of the bearing and on the bushing 28. The insulating insert 30 is overmolded on the outer surface 14*a* of the outer ring 14 and on the bore 28*b* in the bushing 28.

The insulating insert 30 has an annular shape. The insulating insert 30 extends axially. The insulating insert 30 comprises a cylindrical axial outer surface 30*a*, a cylindrical bore 30*b* radially on the opposite side from the outer surface 30*a*, and two opposite radial front faces 30*c*, 30*d* that axially delimit the bore and the outer surface. The radial front faces 30*c*, 30*d* delimit the axial length of the insulating insert 30. The outer surface 30*a* and the bore 30*b* delimit the radial thickness of the insulating insert 30. The outer surface 30*a* is in radial contact with the bore 28*b* in the bushing. The bore 30*b* is in radial contact with the outer surface 14*a* of the outer ring, and with the grooves 22, 24. The bore 30*b* has a stepped shape.

In the exemplary embodiment illustrated, the faces 14*c*, 30*c*, 28*c* and 14*d*, 30*d*, 28*d* of the outer ring, of the insulating insert and of the bushing are respectively coplanar.

Alternatively, it is possible to provide other arrangements. For example, the insulating insert 30 could have a smaller axial dimension and be axially set back from the faces 14*c*, 14*d* of the outer ring. Alternatively, the insulating insert 30 could have a larger axial dimension and protrude axially from the faces 14*c*, 14*d* of the outer ring. In this case, the insulating insert 30 may at least partially cover these faces 14*c*, 14*d*. In a variant, the insulating insert 30 could at least partially cover the faces 28*c*, 28*d* of the bushing.

In another alternative or in combination, the bushing 28 could protrude axially from the insulating insert 30 with respect to the faces 30*c* and 30*d*, or be axially set back from these faces.

In the exemplary embodiments illustrated, the first ring 12 of the bearing is the inner ring and the second ring 14, to which the insulating insert 30 is fastened, is the outer ring.

Alternatively, it is possible to provide an opposite disposition, in which the second ring 14, to which the insulating insert 30 is fastened, is the inner ring. In this case, the insulating sleeve is situated in the bore 12*a* in the inner ring. The insulating insert is then interposed radially between the bore 12*a* in the inner ring and the outer surface of the bushing. The insulating insert is fastened to the inner ring and at least to the outer surface of the bushing. The bore in the bushing delimits the bore in the bearing device. The concave radius or radii in this case connect the front faces of the bushing to the bore.

In the exemplary embodiments described, the bearing of the device is provided with a single row of rolling elements. In a variant, the bearing may be provided with several rows of rolling elements. Furthermore, the rolling bearing may comprise other types of rolling elements than balls, for example rollers. In another variant, the bearing may be a plain bearing without rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved insulated bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing device comprising:

a bearing including a first ring and a second ring configured to rotate relative to each other, the second ring having a first cylindrical surface and a second cylindrical surface radially spaced from the first cylindrical surface, a bushing having an axial length and a first cylindrical surface and a second cylindrical surface radially spaced from the first cylindrical surface of the bushing and a first axially facing front face and a second axially facing front face parallel to the first axially facing front face, and an electrically insulating insert overmolded between and connecting the first cylindrical surface of the bushing and the second cylindrical surface of the second ring, wherein a first convex surface connects the first cylindrical surface of the bushing to the first front face of the bushing, the first convex surface having a first radius of curvature, and wherein the first convex surface meets the first cylindrical surface at a first sharp edge and the first convex surface meets the first front face of the bushing at a second sharp edge.

2. The bearing device according to claim 1, wherein a second convex surface connects the first cylindrical surface of the bushing to the second front face of the bushing, the second convex surface having a second radius of curvature, and wherein the second convex surface meets the first cylindrical surface at a third sharp edge and the second convex surface meets the second front face of the bushing at a fourth sharp edge.

3. The bearing device according to claim 2, wherein the first radius of curvature is equal to the second radius of curvature.

4. The bearing device according to claim 2, wherein the bushing is made of metal.

5. The bearing device according to claim 4, wherein the bushing is obtained by pressing.

6. The bearing device according to claim 4, wherein the bushing is obtained by machining.

7. An electric motor comprising:

a housing, a shaft, and at least one bearing device according to claim 1 radially mounted between the housing and the shaft.

8. A method for manufacturing a bushing of a bearing device according to claim 1, comprising the following successive steps:

a step of producing a bushing blank that gives a basic geometry of the bushing blank, a heat treatment step for giving the bushing blank the required hardness, a step of radially grinding the first front face of the bushing blank and a part of the first concave radius which is adjacent to the first front face, and a step of axially grinding the other surface of the bushing blank and a part of the first concave radius which is adjacent to the other surface.

* * * * *